Patented Apr. 24, 1945

2,374,316

UNITED STATES PATENT OFFICE 2,374,316

OIL SOLUBLE RESINS

Leo Robert Whiting, Woodbridge, N. J., assignor to Bakelite Corporation, New York, N. Y., a corporation of New Jersey No Drawing. Application May 15, 1940, Serial No. 335,322

18 Claims. (Cl. 260—19)

This invention relates to oil-soluble resins useful in preparing oil varnishes and similar compositions.

Among the different types of resins which are in commercial use are the polystyrene resins because of their pale color, excellent color stability, toughness, electrical properties and resistance to many corrosive alkalies and acids. They are, however, insoluble in drying oils.

The present invention has for its basis the discovery that resinous products with the desirable properties of polystyrene resins, can be made which are readily soluble in fatty or drying oils. The products are solids, pale in color and of low average molecular weight (i. e. a polymerization degree of less than 100 monomer units) with a substantially complete absence of higher polymers that are insoluble in oils. When dissolved in oils they yield bright clear varnishes which on drying in film form at either room or elevated temperatures yield transparent coatings of excellent color, elasticity and resistance to moisture, weak alkalies and weathering.

The invention depends upon the addition of an oil-soluble phenolic resin to a styrene monomer and then causing polymerization, in the sense that monomeric styrene is not present in the product, to take place. The phenolic resin is incompatible with high molecular weight polystyrene, and it forms upon melting with low molecular weight polystyrene a mixture having a melting point so low as to be a soft, plastic solid or viscous liquid at normal room temperature, but when added to the monomer in the same proportions and then reacted, a solid results having a melting point of 140–210° F., depending upon the ratios employed which is indicative of a modifying effect of the phenolic resin on the reaction. Moreover, highly polymerized styrene even in traces, is insoluble in drying oils; but the inclusion of the phenolic resin in the monomer followed by polymerization imparts the property of solubility in oils, and amounts as small as 5 per cent or less of the weight of the styrene may be sufficient for this purpose depending upon reaction conditions. There is no upper limit to the amount of phenolic resin that can be added, the only result being that the properties of the product are modified in accordance. Not only then do the phenolic resins impart oil-solubility, but they are further useful in making possible a wide range of varnish resins with differing properties and technical applications.

In conjunction with the phenolic resins it is found much preferable to include accelerating agents or catalysts. Catalysts known to be promoters of polymerization such as the peroxides, benzoyl peroxide, etc., are possible agents, and substances containing boron in some form as the halides can be used; but particularly useful are mixtures of an oxy-boron compound wherein oxygen is directly linked to boron, such as boric acid or triamyl borate and organic acids having hydroxy and carboxylic groups on the same or adjacent carbonatoms, namely the alpha-hydroxy acids and ortho-hydroxy aromatic acids, such as oxalic, tartaric, lactic, salicylic, etc. The mixtures have been found to be much more active than either agent alone; as little as 0.1 per cent of boric acid and 0.1 per cent of oxalic acid, based on the weight of styrene, initiate a violent exothermic reaction whereas several times that amount of either acid alone has no perceptible accelerating effect. Rapid reaction and a fast approach to the end point are beneficial in obtaining improvement in the quality of the products.

To demonstrate the effectiveness of the mixed acid catalysts in the reaction, a mixture was prepared from equal parts of a styrene monomer and an oil-soluble para-phenyl-phenol resin; about 5 per cent of tung oil was included. One portion of this mixture without any catalyst was heated until the boiling point of 165° C. was reached; this required about 48 hours when heated at reflux temperature and gave a yield of approximately 95 per cent. Another portion had added to it 0.15 per cent of equal parts of boric and oxalic acids; and under the same procedure the reaction was complete in 5 minutes with a yield of 95 per cent. In each instance a brittle solid resin was obtained. Oil varnishes were made from each of the resins in the proportion of 1 part of resin to 2 parts of tung oil and thinned to 100 k. v. viscosity. The varnishes from the first resin were very hazy and of a color 5 (Hellige comparator); the varnish from the other resin was clear with a color 4.

With adjusted proportions of the catalytic agents the polymerization proceeds rapidly but to a limited degree only, resulting in products characterized by complete polymerization but of relatively low molecular weight. There is considerable evolution of heat in the course of the reaction but the end point is usually reached in a few minutes; this is in contrast to the hours normally required for complete polymerization. Further heating even at temperatures of 200° C. and above produces little or no change, and the products are surprisingly stable.

The polymerizing reaction can be carried out in the presence of an inert solvent or diluent such as toluol, xylol, solvent naphtha, etc.; and other resins, synthetic and natural, can be included in the reaction mass to give a wide variety of modified compositions. The fact that the oil-soluble property can be obtained under such conditions is of particular importance because it permits the utilization of cheap grades of crude styrene obtained from gas or coke oven liquors that consist of styrene mixed with naphthas of about the same boiling point and therefore extremely difficult to separate; excellent yields of satisfactory compositions have been obtained from such crude styrene mixtures, the inert solvent being removed by distillation after the completion of the reaction, and the distillate is found to contain only negligible amounts of unchanged styrene.

Drying or semi-drying oils, such as tung, oiticica, linseed, Perilla, soya, etc., can be present during the polymerizing reaction. The oils, in part at least, apparently assist as blocking agents for preventing long chain polymerizations. If conjugated double bond oils as tung or oiticica are used, however, the proportions should not be over 25 per cent of the mass when the catalyst is present, as these oils are rapidly converted to a gel by the catalyst.

Moreover, inhibitors normally included in styrene to prevent thickening during transit or in storage, as sulfur, tertiary butyl phenol, hydroquinone, catechol, resorcinol, methoxy compounds as guaiacol or their substitution products can be present, for it is found that they do not interfere with the reaction. In fact where conditions are such that the mass can not be heated quickly to reacting temperature it is preferable that inhibitors be present. They should, however, be removed or destroyed either before or after the reaction, as by steam distillation or treatment with alkalies followed by washing with hot water, since they have a deleterious effect upon the drying rate and color of oil varnishes.

Fillers, pigments, etc., as asbestos, ground cork, titanium oxides and various coloring materials can be included in the reaction mass. Fillers are incorporated when the compositions are intended as plastic masses for molding. Because of the high speed of reaction, the resinous component of the molding composition can be included in the unreacted form and set up during a molding operation by the application of heat to start the reaction.

Illustrations of the invention are given in the following examples.

*Example 1.*—200 parts freshly distilled styrene and 200 parts of a p-phenyl phenol-formaldehyde resin containing 2 parts oxalic acid were heated to a clear solution and cooled to 130° C.: 1 part boric acid was then added with rapid stirring. Reaction started immediately and the temperature rose to approximately 180° C. or above. After a few minutes the reaction was complete and further heating at 200° C. produced no further marked change. The yield obtained was about 380 parts of a clear, hard resin soluble in drying oils.

A varnish was prepared by heating 100 parts of the resin with 200 parts of China-wood oil to 500° F. and holding at this temperature until a point was reached at which the varnish, after thinning to 50% solids with mineral spirits, had satisfactory brushing properties. This varnish, after addition of suitable metallic driers, yielded coatings of excellent gloss, toughness, and durability, and exceptional resistance to moisture, weak alkalies and acids.

*Example 2.*—A mixture of 90 parts styrene and 10 parts of p-phenyl phenol-formaldehyde resin was heated to 130° C. 0.2 part of oxalic acid and 0.2 part of boric acid, finely ground, were then added with agitation. Exothermic reaction occurred, and the temperature rose rapidly to 180° C. or above. Distillation to 200° C. under high vacuum removed about 10 parts volatile material and resulted in a moderately hard, pale, oil-soluble resin. Varnishes made from this resin were lighter in color than those made from the resin of Example 1.

*Example 3.*—75 parts styrene, 10 parts of an oil-soluble phenolic resin (as one made from tertiary butyl phenol or para phenyl phenol and formaldehyde) and 15 parts China-wood oil were heated to 130° C. in a vessel fitted with reflux condenser. To this was added a finely powdered mixture of 0.2 part boric acid and 0.2 part oxalic acid. Reaction occurred at once and cooling was required, the temperature being allowed to rise to approximately 180° C. Vacuum distillation was employed to remove any traces of unreacted volatile material.

When cooked with China-wood oil, this resin yielded varnishes of pale color, excellent color stability, durability, alkali and moisture resistance and unusual flexibility and toughness. In addition to their use as coatings for either air drying or baking, they were also compatible with ethyl cellulose and chlorinated rubbers to form quick drying lacquers that yielded strong films suitable for paper and cloth coatings, etc.

*Example 4.*—100 parts styrene, 25 parts phenolic oil-soluble resin (as in Example 3) and 75 parts of rosin or of rosin-glycerol ester were heated rapidly to 130° C., to this were added 1.0 part triamyl borate and 1.0 part salicylic acid, and the temperature was allowed to rise to 200° C. with external heat applied as required. The resulting resin was useful in varnishes and enamels and lower in cost than those of the preceding examples. The proportion of rosin or rosin-glycerol ester can be increased as desired. When rosin or other acidic natural resins is used, the final product can later be esterified with glycerol or other polyhydric alcohol or hardened with metallic oxides such as CaO or ZnO.

*Example 5.*—200 parts of a crude styrene mixture, containing approximately 100 parts styrene and 100 parts xylol as obtained by fractionation of coke or gas plant liquors had added thereto 100 parts of p-phenyl phenol-formaldehyde resin; the mass was heated to boiling and 0.5 part boric and 0.5 part oxalic acid were added. The mass was refluxed for 2 hours or until practically all the styrene present was converted, and the inert solvent was then distilled off. The remaining resin was soluble in fatty oils and similar in other properties to that of Example 1.

Pure styrene can be diluted with inert solvents and treated in the same manner; this permits a close control of the reacting temperatures, and it provides a means of removing excess heat of reaction through the condenser cooling.

In general the resinous products have been found useful as coatings for wood, metals, fabrics, paper, Cellophane, leather, the interiors of cans, etc., on account of their flexibility, good color, durability and low moisture permeability. Among the specific applications may be mentioned: finishes on wood, steel, tin plate, and rubber waterproofed fabrics, Cellophane wrappers, bottle cap liners, coatings on fixtures, cosmetic containers, leather for shoes and upholstering, linoleum, brake linings, laminated and molded plastic articles, cable insulation, wall board, etc.

What is claimed is:

1. Product characterized by thermoplasticity and oil-solubility comprising essentially a monomeric styrene reacted with an inherently oil-soluble phenol-aldehyde resin.

2. Product characterized by thermoplasticity and oil-solubility comprising essentially a monomeric styrene reacted with an inherently oil-soluble phenol-aldehyde resin in the presence of a catalyst.

3. Product characterized by thermoplasticity and oil-solubility comprising essentially a monomeric styrene reacted with an inherently oil-soluble phenol-aldehyde resin in the presence of a catalyst including an admixture of an oxy-boron compound and an organic carboxylic acid selected from the group consisting of alpha-hydroxy acids, ortho-hydroxy-aromatic acids and oxalic acid.

4. Product characterized by thermoplasticity and oil-solubility comprising essentially a monomeric styrene reacted with an inherently oil-soluble phenol-aldehyde resin in the presence of a catalyst comprising boric acid and oxalic acid.

5. Product characterized by thermoplasticity and oil-solubility comprising essentially a monomeric styrene reacted with an inherently oil-soluble phenyl-phenol and formaldehyde resin.

6. Product characterized by thermoplasticity and oil-solubility comprising predominantly a monomeric styrene reacted with an inherently oil-soluble phenyl-phenol and formaldehyde resin in proportions of at least 5 per cent of the weight of the product.

7. Method of preparing an oil-soluble thermoplastic product which comprises adding an inherently oil-soluble phenol-aldehyde resin to a monomeric styrene, and causing a reaction.

8. Method of preparing an oil-soluble thermoplastic product which comprises adding an inherently oil-soluble phenol-aldehyde resin to a monomeric styrene, and causing a reaction in the presence of a catalyst.

9. Method of preparing an oil-soluble thermoplastic product which comprises adding an inherently oil-soluble phenol-aldehyde resin to a monomeric styrene, and causing a reaction in the presence of a catalyst including an admixture of an oxy-boron compound and an organic carboxylic acid selected from the group consisting of alpha-hydroxy acids, ortho-hydroxy-aromatic acids and oxalic acid.

10. Method of preparing an oil-soluble thermoplastic product which comprises adding an inherently oil-soluble phenol-aldehyde resin to a monomeric styrene, and causing a reaction in the presence of a catalyst comprising boric acid and oxalic acid.

11. Method of preparing an oil-soluble thermoplastic product which comprises reacting a monomeric styrene with an inherently oil-soluble resin prepared from a hydrocarbon substituted phenol and formaldehyde.

12. Method of preparing an oil-soluble thermoplastic product which comprises reacting a monomeric styrene with an inherently oil-soluble resin prepared from a hydrocarbon substituted phenol and formaldehyde in the presence of an inert solvent.

13. Product characterized by thermoplasticity and oil-solubility comprising essentially monomeric styrene reacted with an inherently oil-soluble phenol-aldehyde resin in the presence of a catalyst including an admixture of an oxy-boron compound and an alpha hydroxy carboxylic acid.

14. Method of preparing an oil-soluble thermoplastic product which comprises adding an inherently oil-soluble phenol-aldehyde resin to a monomeric styrene, and causing a reaction in the presence of a catalyst including an admixture of an oxy-boron compound and an alpha hydroxy carboxylic acid.

15. A product characterized by thermoplasticity and oil-solubility formed by reacting together monomeric styrene, an inherently oil-soluble phenol-aldehyde resin and up to 25 per cent by weight of the total reactants of a conjugated double bond drying oil in the presence of a catalyst including an admixture of an oxy-boron compound and an organic carboxylic acid selected from the group consisting of alpha-hydroxy acids, ortho-hydroxy acids and oxalic acid.

16. A product characterized by thermoplasticity and solubility in drying oils formed by reacting together monomeric styrene, an inherently oil-soluble phenol-aldehyde resin and a non-conjugated drying oil in the presence of a catalyst including an admixture of an oxy-boron compound and an organic carboxylic acid selected from the group consisting of alpha-hydroxy acids, ortho-hydroxy acids and oxalic acid.

17. A varnish composition characterized by solubility in mineral spirits comprising the product of claim 1 heat reacted with a drying oil.

18. A varnish composition characterized by solubility in mineral spirits comprising the product resulting from the process of claim 11 heat reacted with a drying oil.

LEO ROBERT WHITING.